(12) United States Patent
Cheng

(10) Patent No.: US 11,537,473 B2
(45) Date of Patent: Dec. 27, 2022

(54) METHOD FOR CONTROLLING OTHER SYSTEMS BASED ON SINGLE-POINT EXECUTION CONTRACT

(71) Applicant: SHANGHAI WEIERLIJIE NETWORK TECHNOLOGY DEVELOPMENT CO., LTD., Shanghai (CN)

(72) Inventor: Wenbin Cheng, Shenzhen (CN)

(73) Assignee: SHANGHAI WEIERLIJIE NETWORK TECHNOLOGY DEVELOPMENT CO., LTD., Shanghai (CN)

( * ) Notice: Subject to any disclaimer, the term of this patent is extended or adjusted under 35 U.S.C. 154(b) by 0 days.

(21) Appl. No.: 17/586,802

(22) Filed: Jan. 28, 2022

(65) Prior Publication Data

US 2022/0156153 A1 May 19, 2022

Related U.S. Application Data

(63) Continuation of application No. PCT/CN2019/104645, filed on Sep. 6, 2019.

(30) Foreign Application Priority Data

Aug. 29, 2019 (CN) .......................... 201910809613.2

(51) Int. Cl.
*G06F 11/00* (2006.01)
*G06F 11/14* (2006.01)
*G06F 21/64* (2013.01)

(52) U.S. Cl.
CPC .......... *G06F 11/1405* (2013.01); *G06F 21/64* (2013.01)

(58) Field of Classification Search
CPC ............................ G06F 11/1405; G06F 21/64
See application file for complete search history.

(56) References Cited

U.S. PATENT DOCUMENTS

2017/0300627 A1 10/2017 Giordano et al.
2019/0013948 A1* 1/2019 Mercuri .................. G06F 16/27
(Continued)

FOREIGN PATENT DOCUMENTS

| CN | 108650182 A | 10/2018 |
| CN | 109391661 A | 2/2019 |
| CN | 109978687 A | 7/2019 |

OTHER PUBLICATIONS

International Search Report issued in corresponding International application No. PCT/CN2019/104645, dated May 27, 2020.
(Continued)

*Primary Examiner* — Joshua P Lottich

(57) ABSTRACT

The invention discloses a method for controlling other systems based on a single-point execution contract, comprising the following steps: A, when a contract developer writes a single-point execution contract code, integrating a command needing transparent transmission into the code; B, executing, by a virtual machine, the code, calling a transparent-transmission channel command input interface while executing to a row with the command, and transmitting the command to a blockchain node; and C, not processing the command by the blockchain node, and calling a secondary development service package interface through the transparent-transmission command to transmit downwards. In the method, a command transparent-transmission channel and a transparent-transmission command secondary development package service are designed, so that a blockchain user can operate their specific software/hardware equipment through a user-defined command. The verification of the contract execution results is not influenced, and a situation where (Continued)

contract execution passed but verification failed can be avoided.

7 Claims, 2 Drawing Sheets

(56) References Cited

U.S. PATENT DOCUMENTS

| | | | | |
|---|---|---|---|---|
| 2019/0303623 A1* | 10/2019 | Reddy | ..................... | G06F 8/71 |
| 2020/0167243 A1* | 5/2020 | Rauh | ..................... | H04L 67/10 |
| 2020/0379856 A1* | 12/2020 | Jayachandran | ....... | G06F 21/602 |
| 2020/0387417 A1* | 12/2020 | Wang | ..................... | H04L 9/50 |
| 2020/0387432 A1* | 12/2020 | Kamijoh | ............. | G06F 11/1469 |
| 2020/0387433 A1* | 12/2020 | Wang | ................. | G06F 11/3051 |
| 2020/0387440 A1* | 12/2020 | Shao | ................... | G06F 11/3608 |
| 2022/0171607 A1* | 6/2022 | Qiu | .................... | G06F 11/3409 |
| 2022/0255763 A1* | 8/2022 | Campbell | ................ | H04L 9/30 |

OTHER PUBLICATIONS

Written Opinion of the International Searching Authority for No. PCT/CN2019/104645.

* cited by examiner

METHOD FOR CONTROLLING OTHER SYSTEMS BASED ON SINGLE-POINT EXECUTION CONTRACT

TECHNICAL FIELD

The present invention relates to the technical field of smart contracts, in particular to a method for controlling other systems based on a single-point execution contract.

BACKGROUND ART

For the smart contract, a computer scientist Nick Saab published a paper on "Smart Contract" in 1994, announcing the birth of the smart contract theory.

Before the birth of the smart contract theory, the smart contract has been already in practical use, for example, shop vending machines and bank's ATM machines, which have been in use since the 1980s and 1990s, are typical application scenarios of the smart contract. The program (the smart contract) of the vending machines/ATM machines cannot be randomly tampered due to closure property of related networks and an enclosed shell of hardware, thereby gaining everyone's trust.

Ethereum network, which was on line in 2015, creatively integrates the smart contract into a block chain network and achieves trusted use, in a computer network, of the pure software smart contract. However, a very prominent problem also emerged. As the Ethereum contract is executed on the whole network and verified on the whole network, the smart contract is isolated (the smart contract on the block chain network cannot be verified as a result of inability of receiving uncertain information input) in the block chain network (the safety problem that a software/hardware system is controlled by other contracts may be caused as it is uncertain that the execution results of which machine will be confirmed). In such a manner, other software/hardware systems cannot be operated especially when the software and the hardware do not have unified operation control command.

In 2018, a smart contract capable of achieving "single-point execution and whole-network verification" was disclosed in the patent application with the application number "CN201810978754.2" (publication number "CN109067759A"). Based on the proposal of the contract, it is possible to control specific software/hardware through the contract.

TECHNICAL SOLUTION OF THE INVENTION

The present invention aims to provide a method for controlling other systems based on a single-point execution contract to solve the problems in the background art.

To achieve the objective, the present invention adopts the following scheme:

A method for controlling other systems based on a single-point execution contract that includes the following steps:

A, when a contract developer writes a single-point execution contract code, integrating a command needing transparent transmission into the contract code;

B, executing, by a virtual machine, the contract code, calling a transparent-transmission channel command input interface when the execution proceeds to a row where the command needing transparent transmission is located, and transmitting the command to a blockchain node;

C, enabling the blockchain node not to process the command, and calling a secondary development service package interface through the transparent-transmission command to transmit downwards; and D, operating, by the code in a secondary development service package, other systems based on business processing flow defined by the contract developer to accomplish business processing, and then executing the next step;

E, after execution of the contract, creating return transaction executed by the contract and broadcasting the return transaction to the whole network;

F, if execution of step E is abnormal, terminating this contract calling execution, listing the contract calling transaction into an abnormal list without any return transaction, and manually triggering the execution again after faults are eliminated; and G, after the package of the contract transaction is confirmed, receiving, by secondary development service package program, related subscribed transaction confirmation information, and starting business flow processing after the transaction is confirmed.

As a further technical solution of the present invention: the service secondarily developed by the package must be deployed for the node executing the contract.

As a further technical solution of the present invention: other systems include software and hardware.

As a further technical solution of the present invention: step F further includes operation of feeding back the execution results.

As a further technical solution of the present invention: a process verifying the node through the contract specifically includes the following steps: 1) receiving the broadcast contract return transaction, and starting the contract virtual machine to perform a contract verification process; 2) executing, by the virtual machine, the contract code, calling a transparent-transmission channel command input interface when the execution proceeds to a row where the command needing transparent transmission is located, and enabling the virtual machine not to transmit the command needing transparent transmission downwards as a result of the contract verification process; 3) continuously executing, by the virtual machine, other codes of the contract for contract verification; and 4), after the contract is completely verified successfully, packaging, and continuing other transaction verification.

As a further technical solution of the present invention: step A further needs adding a transparent-transmission channel input calling interface.

As a further technical solution of the present invention: the command needing transparent transmission is self-defined and designed by the contract developer according to the needs.

Compared with the prior art, the present invention has the following beneficial effects. Firstly, on the basis of the disclosed patent, the blockchain user can operate their own specific software/hardware equipment through the user-defined command by designing the command transparent-transmission channel and the transparent-transmission command secondary development package service. Secondly, the method does not affect the verification of the contract execution results and cause a situation where contract execution passed but verification failed. Thirdly, the method does not cause a situation that software/hardware input from the node is controlled by the contract issued by other node users.

DETAILED DESCRIPTION

The technical solutions in the embodiments of the present invention will be described clearly and completely in combination with the drawings in the embodiments of the present invention. Obviously, the described embodiments are part of, but not all of, the embodiments of the present invention. Based on the embodiments in the present invention, all other embodiments obtained by a person of ordinary skill in the art without creative efforts shall fall within the protection scope of the present invention.

Figure 1:
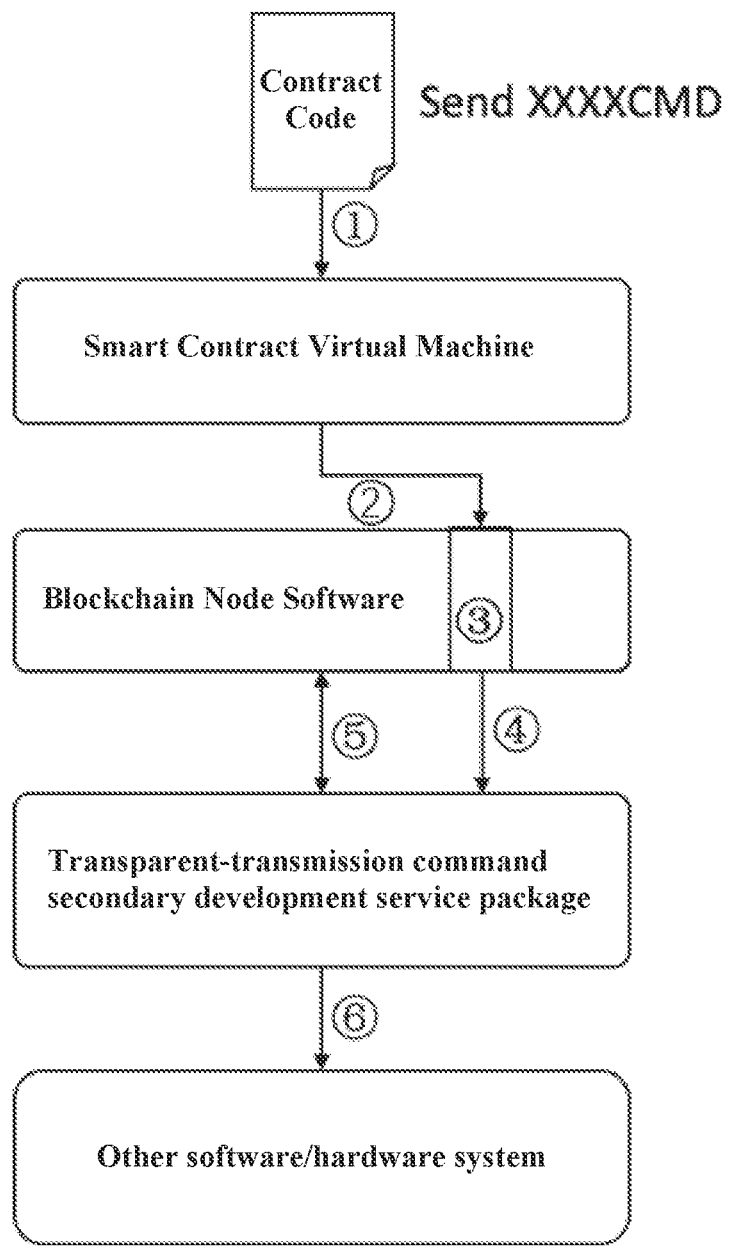
FIG. 1 is a schematic diagram showing a contract execution node.
Figure 2:
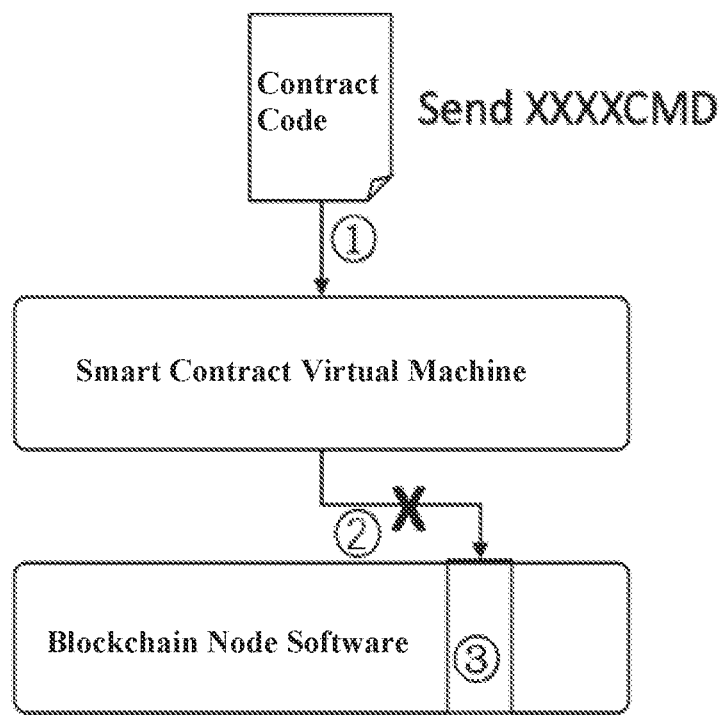
FIG. 2 is a schematic diagram showing a contract verification node.

Embodiment 1: refer to FIG. 1 to FIG. 2, a method for controlling other systems based on a single-point execution contract includes the following steps:

A, when a contract developer writes a single-point execution contract code, integrating command needing transparent transmission into the contract code;

B, executing, by a virtual machine, the contract code, calling a transparent-transmission channel command input interface when the execution proceeds to a row where the command needing transparent transmission is located, and transmitting the command to a blockchain node;

C, enabling the blockchain node not to process the command, and calling a secondary development service package (the node executing the contract needing to deploy the service secondarily developed by the package) interface through the transparent-transmission command to transmit downwards;

D, operating, by the code in a secondary development service package, other software/hardware based on business processing flow defined by the contract developer to accomplish business processing, and then executing the next step;

E, after execution of the contract, creating return transaction executed by the contract and broadcasting the return transaction to the whole network;

F, if execution of the fourth step is abnormal, terminating this contract calling execution (not feeding back if the execution results do not need to fed back), listing the contract calling transaction into an abnormal list without any return transaction, and manually triggering the execution again after faults are eliminated; and G, after the package of the contract transaction is confirmed, receiving, by secondary development service package program, related subscribed transaction confirmation information, and starting business flow processing after the transaction is confirmed.

The contract command (the command being capable of being self-defined by the contract developer according to the needs) transparent-transmission channel in the blockchain node software is a middle grid of a blockchain node software in FIG. 1, and a transparent-transmission channel input calling interface is also added.

The transparent-transmission command secondary development service package is provided, which is responsible for shielding operation system difference, isolating controlled system/hardware, providing a transparent-transmission command receiving interface, providing secondary development ability on other software/hardware, and providing ability of subscribing blockchain node information and receiving information to secondary develop.

Embodiment 2: on the basis of Embodiment 1, a process verifying the node through the contract specifically includes the following steps: 1) receiving the broadcast contract return transaction, and starting the contract virtual machine to perform a contract verification process; 2) executing, by the virtual machine, the contract code, calling a transparent-transmission channel command input interface when the execution proceeds to a row where the command needing transparent transmission is located, and enabling the virtual machine not to transmit the command needing transparent transmission downwards as a result of the contract verification process; 3) continuously executing, by the virtual machine, other codes of the contract for contract verification; and 4), after the contract is completely verified successfully, packaging, and continuing other transaction verification.

It is apparent to those skilled in the art that the present invention is not limited to the details of the above-described exemplary embodiments, and the present invention can be embodied in other specific forms without departing from the spirit or essential characteristics of the present invention. Therefore, the present embodiments are to be considered as illustrative and not restrictive, and the scope of the present invention is defined by the appended claims instead. All changes in the meaning and scope of equivalent elements are included in the present invention. Any reference signs in the claims should not be construed as limiting the claims.

In addition, it should be understood that although this specification is described in terms of embodiments, not every embodiment includes only an independent technical solution. This description of the specification is for clarity only, and those skilled in the art should take the specification as a whole. The technical solutions in the embodiments can also be appropriately combined to form other implementations that can be understood by those skilled in the art.

The invention claimed is:

1. A method for controlling other systems based on a single-point execution contract, comprising the following steps:

step A, when a contract developer writes a single-point execution contract code, integrating command needing transparent transmission into the contract code;

step B, executing, by a virtual machine, the contract code, calling a transparent-transmission channel command input interface when the execution proceeds to a row where the command needing transparent transmission is located, and transmitting the command to a blockchain node;

step C, enabling the blockchain node not to process the command, and calling a secondary development service package interface through the transparent-transmission command to transmit downwards;

step D, operating, by the code in a secondary development service package, other systems based on business processing flow defined by the contract developer to accomplish business processing, and then executing the next step;

step E, after execution of the contract, creating return transaction executed by the contract and broadcasting the return transaction to the whole network;

step F, if execution of the step E is abnormal, terminating this contract calling execution, listing the contract calling transaction into an abnormal list without any return transaction, and manually triggering the execution again after faults are eliminated, and step G, after the package of the contract transaction is confirmed, receiving, by secondary development service package program, related subscribed transaction confirmation information, and starting business flow processing after the transaction is confirmed.

2. The method for controlling other systems based on the single-point execution contract according to claim 1, wherein secondary development service package must be deployed for the node executing the contract.

3. The method for controlling other systems based on the single-point execution contract according to claim 1, wherein the other systems comprise software and hardware.

4. The method for controlling other systems based on the single-point execution contract according to claim 1, wherein the step F further comprises operation of feeding back the execution results.

5. The method for controlling other systems based on the single-point execution contract according to claim 1, further comprising a process verifying the node through the contract, which specifically comprises the following steps: 1) receiving the broadcast contract return transaction, and starting the contract virtual machine to perform a contract verification process; 2) executing, by the virtual machine, the contract code, calling a transparent-transmission channel command input interface when the execution proceeds to a row where the command needing transparent transmission is located, and enabling the virtual machine not to transmit the command needing transparent transmission downwards as a result of the contract verification process; 3) continuously executing, by the virtual machine, other codes of the contract for contract verification; and 4), after the contract is completely verified successfully, packaging, and continuing other transaction verification.

6. The method for controlling other systems based on the single-point execution contract according to claim 5, wherein the step A further needs adding a transparent-transmission channel input calling interface.

7. The method for controlling other systems based on the single-point execution contract according to claim 1, wherein the command needing transparent transmission is self-defined and designed by the contract developer according to the needs.

* * * * *